(12) United States Patent
Rice

(10) Patent No.: US 10,710,317 B2
(45) Date of Patent: Jul. 14, 2020

(54) COMPOSITE ROTATABLE ASSEMBLY FOR AN AXIAL-FLOW COMPRESSOR

(71) Applicant: Rolls-Royce North American Technologies, Inc., Indianapolis, IN (US)

(72) Inventor: Edward C. Rice, Indianapolis, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 281 days.

(21) Appl. No.: 15/623,883

(22) Filed: Jun. 15, 2017

(65) Prior Publication Data

US 2017/0363104 A1 Dec. 21, 2017

Related U.S. Application Data

(60) Provisional application No. 62/350,850, filed on Jun. 16, 2016.

(51) Int. Cl.
| | | |
|---|---|---|
| *B29C 70/16* | (2006.01) | |
| *F01D 5/30* | (2006.01) | |
| *F04D 29/32* | (2006.01) | |
| *F04D 29/02* | (2006.01) | |
| *B29C 70/34* | (2006.01) | |
| *B29K 105/10* | (2006.01) | |

(Continued)

(52) U.S. Cl.
CPC .............. *B29C 70/16* (2013.01); *B29C 70/34* (2013.01); *F01D 5/30* (2013.01); *F01D 5/3038* (2013.01); *F04D 29/023* (2013.01); *F04D 29/322* (2013.01); *B29K 2071/00* (2013.01); *B29K 2105/10* (2013.01); *B29K 2307/04* (2013.01); *B29K 2995/0037* (2013.01); *B29L 2031/7504* (2013.01); *F05D 2260/30* (2013.01); *F05D 2300/603* (2013.01); *F05D 2300/614* (2013.01); *Y02T 50/672* (2013.01)

(58) Field of Classification Search
CPC ................................ F01D 5/30; F01D 5/3038
See application file for complete search history.

(56) References Cited

U.S. PATENT DOCUMENTS

| | | | | |
|---|---|---|---|---|
| 3,515,501 A | * | 6/1970 | Palfreyman | ............. F01D 5/282 |
| | | | | 416/193 R |
| 3,904,316 A | * | 9/1975 | Clingman | ................. F01D 5/28 |
| | | | | 416/218 |

(Continued)

FOREIGN PATENT DOCUMENTS

| | | |
|---|---|---|
| WO | 2014163709 A2 | 10/2014 |
| WO | 2015080781 A2 | 6/2015 |

*Primary Examiner* — Kayla Mccaffrey
*Assistant Examiner* — John S Hunter, Jr.
(74) *Attorney, Agent, or Firm* — Barnes & Thornburg LLP

(57) ABSTRACT

A composite rotatable assembly for an axial flow compressor comprises a spool having a plurality of blade assemblies arranged in stages on the spool and attached thereto by a wound band. Each blade assembly comprises a blade and a base, with the base having a forward tang extending axially forward of a leading edge of the blade and an aft tang extending axially aft of a trailing edge of the blade. The band is wound over at least a portion of the forward and aft tangs of the plurality of blade assemblies to hold the blade assemblies to the spool under centrifugal loading. An abradable layer may be added over the wound band.

14 Claims, 15 Drawing Sheets

(51) Int. Cl.
   *B29K 71/00*     (2006.01)
   *B29K 307/04*    (2006.01)
   *B29L 31/00*     (2006.01)

(56) References Cited

U.S. PATENT DOCUMENTS

| | | | |
|---|---|---|---|
| 6,443,697 B1 * | 9/2002 | Rossi | F01D 5/34 |
| | | | 415/202 |
| 7,578,655 B1 | 8/2009 | Matheny | |
| 8,028,513 B2 | 10/2011 | Norris et al. | |
| 8,382,436 B2 | 2/2013 | Ammann | |
| 8,920,127 B2 | 12/2014 | McCaffrey | |
| 8,936,440 B2 | 1/2015 | Alvanos | |
| 8,984,895 B2 | 3/2015 | Kesseli et al. | |
| 9,745,856 B2 * | 8/2017 | Uskert | F01D 5/282 |
| 10,202,853 B2 * | 2/2019 | Kleinow | F01D 5/22 |
| 2014/0205463 A1 | 7/2014 | Herraiz et al. | |
| 2015/0023793 A1 * | 1/2015 | Bensalah | F01D 5/225 |
| | | | 416/193 A |

\* cited by examiner

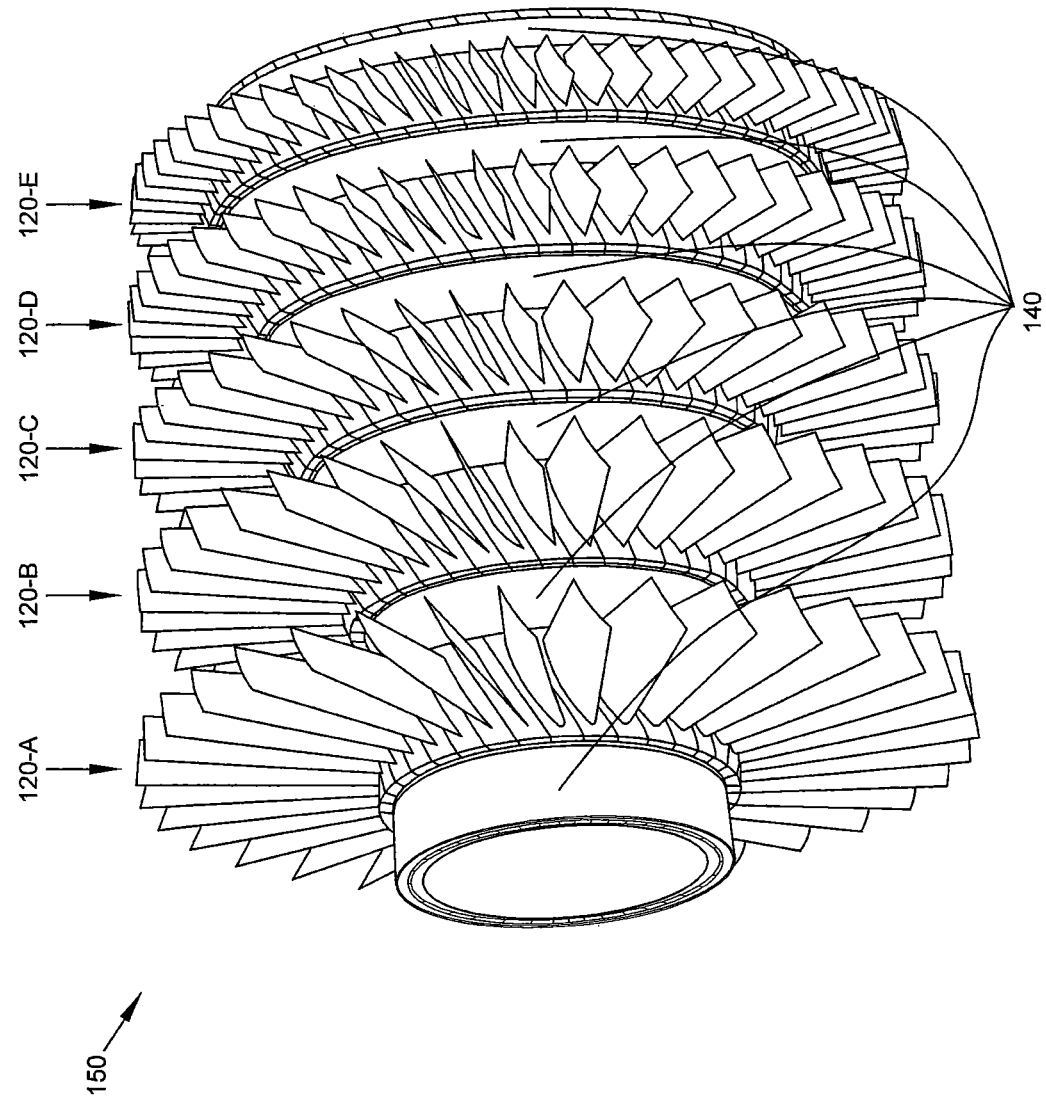

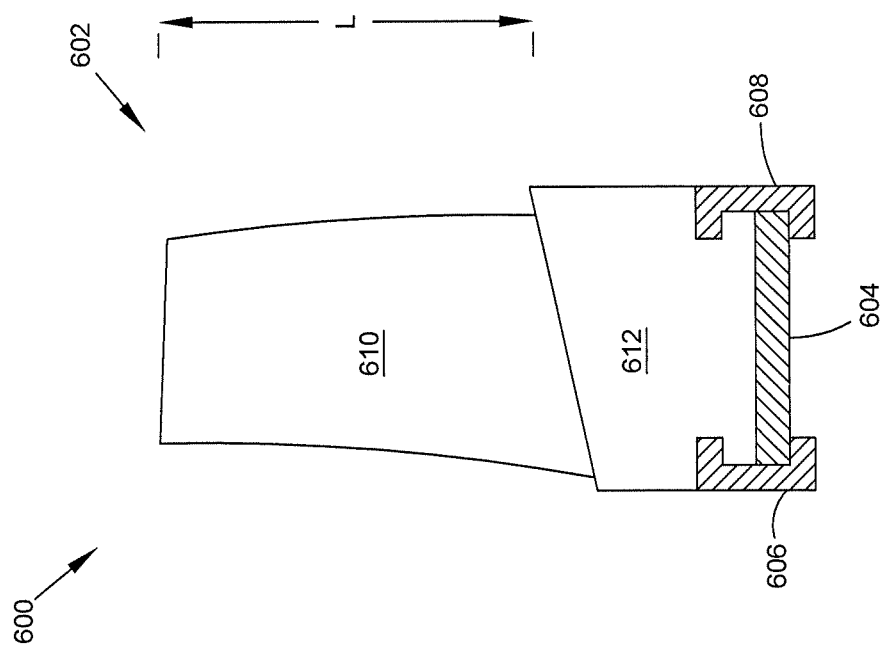

COMPOSITE ROTATABLE ASSEMBLY FOR AN AXIAL-FLOW COMPRESSOR

CROSS REFERENCE TO RELATED APPLICATIONS

This application is a utility application of and claims priority to provisional application entitled "COMPOSITE ROTATABLE ASSEMBLY FOR AN AXIAL-FLOW COMPRESSOR", U.S. Application No. 62/350,850 filed on Jun. 16, 2016, the entirety of which is hereby incorporated by reference.

FIELD OF THE DISCLOSURE

The present disclosure relates generally to fluid compression, and more specifically to a rotatable assembly constructed from composite materials for use in an axial-flow fluid compressor.

BACKGROUND

Axial-flow compressors are used in a variety of applications to compress a fluid from an inlet pressure to a discharge pressure which is higher than inlet pressure. Axial-flow compressors typically comprise a rotatable assembly of a plurality of blades mounted to a rotor and astatic assembly of a plurality of vanes mounted to a casing. The cross-sectional area of the fluid passage in an axial-flow compressor typically decreases as the fluid travels from inlet to discharge. In operation, the rotating blades accelerate the fluid into a diminishing cross-sectional area, thus compressing or pressurizing the fluid.

Applications of axial-flow compressors include gas turbine engines, where an axial-flow compressor supplies high pressure air to a combustor. The rotor of the compressor may be coupled to at least a portion of the rotor of the turbine component in the gas turbine engine. In such applications, the weight of the compressor—and of the engine as a whole—can be a critical factor. For example, in aviation applications such as an axial-flow compressor used in an engine for an aircraft, missile, or other airborne element, the weight of the compressor can significantly affect performance, cost, and capabilities of the airborne element.

For this reason, recent interest has been shown in substituting metal engine components with those made of lightweight composite materials. In addition to weighing less than metal components, engine components fabricated from composite materials may demonstrate improved thermal properties and may have lower material and manufacturing costs than metal components. However, engine components fabricated from composite materials may also have drawbacks such as lower loading and stress tolerances.

It is thus desired for an improvement in the art of fabricating engine components, and particularly axial flow compressors, from composite materials to provide for a lighter and less expensive alternative to metal-based compressors.

SUMMARY

The present application discloses one or more of the features recited in the appended claims and/or the following features which, alone or in any combination, may comprise patentable subject matter.

According to an aspect of the present disclosure, a composite turbomachine comprises a spool comprised of fiber and resin; a plurality of blade assemblies, each one of the plurality of blade assemblies comprising: a blade having a tip, a root, a leading edge, and a trailing edge, the blade mounted to a base at the root; a forward tang and an aft tang extending from the base; wherein the forward tang extends forward of the leading edge proximate the root and the aft tang extends aft of the trailing edge proximate the root; and wherein the plurality of blade assemblies are arranged circumferentially around the spool at a first axial location, each interlocking with an adjacent blade assembly and retained in position by a band overwrapping the forward tangs and a second band overwrapping the aft tangs forming a first stage.

In some embodiments the first and second band comprise a plurality of fibers interconnected by resin. In some embodiments the first and second band further comprises an radially outward layer of abradable material. In some embodiments the plurality of blade assemblies interlock with each other via the faces of the respective blade platforms. In some embodiments one face of each blade assembly is concave and the other convex. In some embodiments the plurality of blade assemblies are injected molded and encased in a metal alloy. In some embodiments the metal alloy is a nickel alloy. In some embodiments each face of the blade assemblies includes a plurality of teeth that interlock with teeth on an adjacent face.

In some embodiments the turbomachine further comprises the plurality of blade assemblies arranged circumferentially around the spool at a second location aft from the first location, each interlocking with an adjacent blade assembly and retained in position by a third band. In some embodiments the third band comprises a plurality of fiber interconnected by resin. In some embodiments the turbomachine further comprises a plurality of stators located between the first and second locations. In some embodiments the turbomachine further comprises a casing surrounding the plurality of blade assemblies, wherein the plurality of stators are connected to the casing.

In another aspect of the present disclosure, a method of manufacturing a turbomachine comprises the steps of: winding fibers and resin over a mandrell to form a spool; attaching a plurality of blade assemblies circumferentially around the spool at a first axial location, where each of the blade assemblies have a blade and a forward tang extending forward of the blade; winding fibers and resin around the spool and over at least the forward tang of each blade assembly; and, curing the fibers and resin.

In some embodiments the method further comprises the step of covering the winding fibers and resin with an abradable layer. In some embodiments the method further comprises attaching blade assemblies circumferentially around the spool at a second axial location. In some embodiments the method further comprises attaching a plurality of stator blades on a casing and positioning the casing over the spool, wherein the stators are located axially between the first and second locations and engage the abradable layer. In some embodiments the method further comprises attaching the spool to a turbine shaft. In some embodiments the method further comprises forming the blade assemblies, wherein the step of forming the bade assemblies is selected from the group consisting of: forming a composite layup and covering the composite layup with a metal alloy; and injection molding the blade assemblies and encasing the blade assemblies with a metal alloy.

In yet another aspect of the present disclosure, a rotatable assembly for an axial flow compressor comprises a spool adapted to be rotatable about an axis of rotation; a plurality of blade assemblies comprising a blade coupled to a platform member, the platform member having a forward tang extending axially forward of a leading edge of the blade and an aft tang extending axially aft of a trailing edge of the blade, wherein the plurality of blade assemblies are circumferentially arranged on the spool in stages; and a wound band which at least partially covers the forward tang and the aft tang of each of the plurality of blade assemblies.

BRIEF DESCRIPTION OF THE DRAWINGS

The following will be apparent from elements of the figures, which are provided for illustrative purposes and are not necessarily to scale.

FIG. 1E is an isometric view of a partially-assembled rotatable assembly of an axial flow compressor in accordance with some embodiments of the present disclosure.

FIG. 7 is a cross-sectional cutaway view of a blade assembly in an axial stage in accordance with some embodiments of the present disclosure.

Figure 1A:
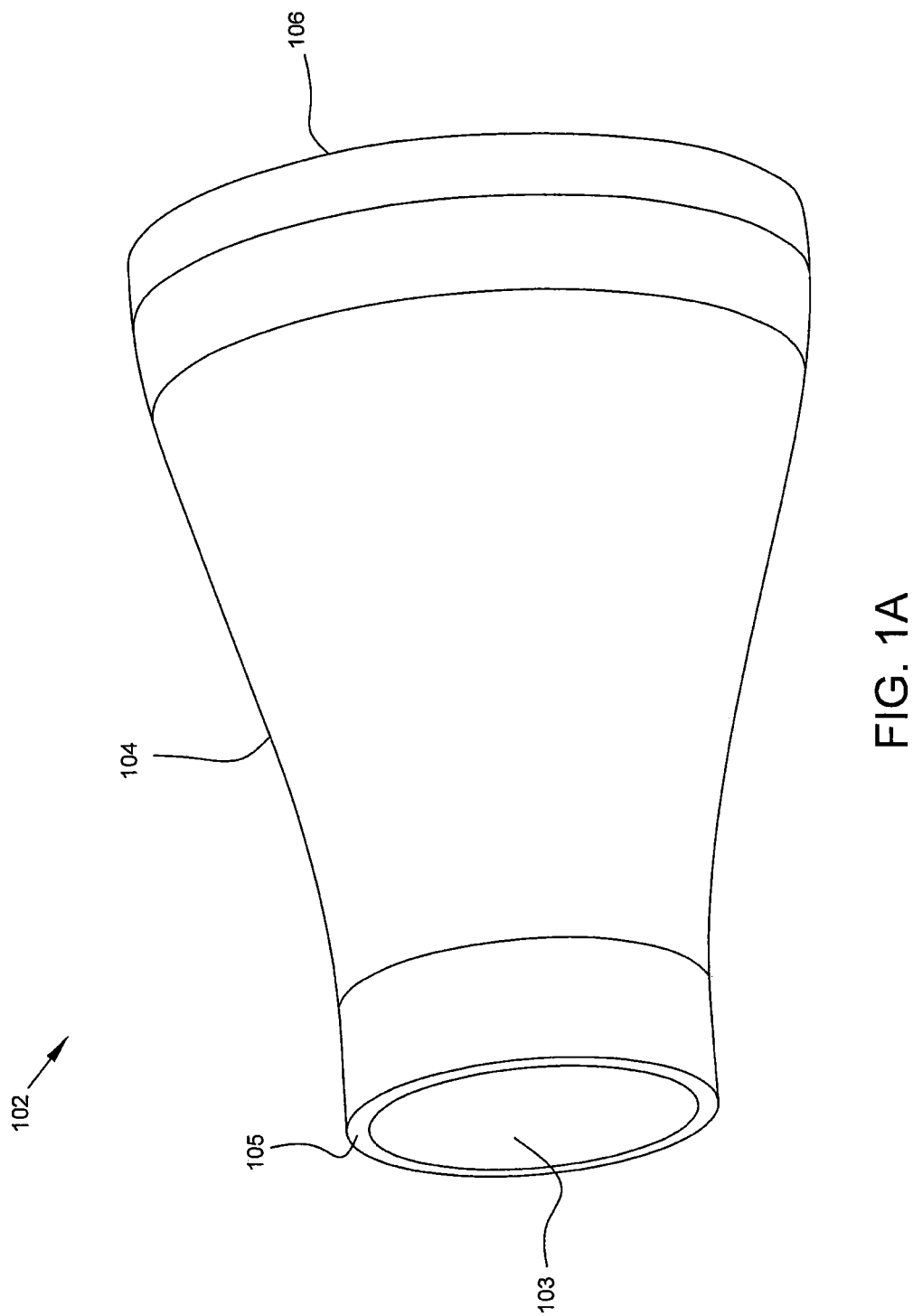
FIG. 1A is an isometric view of a spool for a rotatable assembly of an axial flow compressor in accordance with some embodiments of the present disclosure.

While the present disclosure is susceptible to various modifications and alternative forms, specific embodiments have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the disclosure as defined by the appended claims.

DETAILED DESCRIPTION

For the purposes of promoting an understanding of the principles of the disclosure, reference will now be made to a number of illustrative embodiments illustrated in the drawings and specific language will be used to describe the same.

This disclosure presents systems and methods of fabricating and assembling an axial-flow compressor comprising composite material components to achieve a lighter and less expensive compressor than is currently available in the art. More specifically, the present disclosure is directed to an axial-flow compressor which comprises a spool having a plurality of blade assemblies arranged in stages on the spool and attached thereto by a wound band. Each blade assembly comprises a blade and a base, with the base having a forward tang extending axially forward of a leading edge of the blade and an aft tang extending axially aft of a trailing edge of the blade. The band is wound over at least a portion of the forward and aft tangs of the plurality of blade assemblies to hold the blade assemblies to the spool under centrifugal loading. An abradable layer may be added over the wound band.

Figure 5:
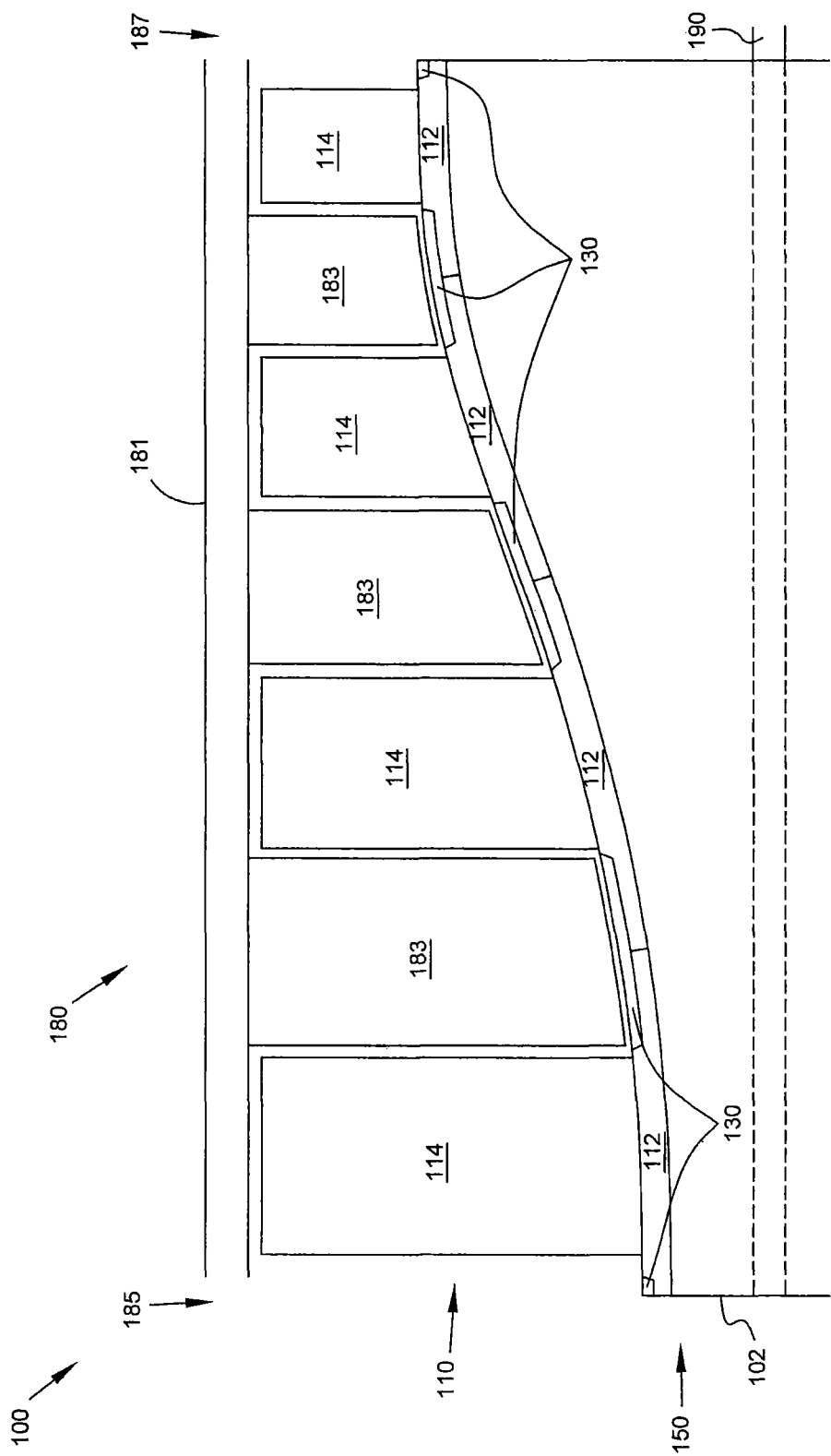
FIG. 5 is a cross-sectional cutaway view of an axial flow compressor in accordance with some embodiments of the present disclosure.

FIG. 5 is a cross-sectional cutaway view of an axial flow compressor 100. An axial flow compressor 100 comprises a rotatable assembly 150 and a static assembly 180. The rotatable assembly 150 is adapted to rotate about an axis of rotation which may be defined by a shaft 190. The rotatable assembly 150 comprises a rotor or spool 102 and a plurality of blade assemblies 110 extending radially outward from the spool 102. Blade assemblies 110 comprises a blade 114 and platform member 112.

The static assembly 180 comprises a casing 181 which encases the rotatable assembly 150 and has a plurality of stator vanes 183 extending radially inward from the casing. A fluid flow path is defined through the axial flow compressor 100 between the casing 181 and the spool 102. As fluid passes from an axially forward end 185 of the compressor 100 to an axially aft end 187, it passes between the blades 114 and stator vanes 183.

FIGS. 1A through 1E present illustrations of the assembly process for the disclosed rotatable assembly 150 of an axial flow compressor 100. FIGS. 1A through 1D show view of a partially assembled rotatable assembly 150, while a fully assembled rotatable assembly 150 is shown in FIG. 1E.

FIG. 1A presents an isometric view of a spool 102 for a rotatable assembly 150 of an axial flow compressor 100. Spool 102 is adapted to be rotatable about an axis passing therethrough. Spool 102 may be hollow, having a tubular structure which defines an interior surface 103 and exterior surface 104. Spool 102 may comprise an axially forward end 105 and axially aft end 106. Axially forward end 105 may have a smaller circumference than axially aft end 106. In other embodiments, spool 102 has a constant circumference between the axially forward end 105 and axially aft end 106.

Spool 102 may be fabricated as a single filament wound component. In some embodiments, spool 102 is fabricated from carbon fiber. The fiber or filament forming the spool 102 may be wound about a mandrel to achieve the desired size and shape. In some embodiments spool 102 is formed from metal or a metal-based compound or alloy.

Resins may be used to bind together the wound fibers or filament and achieve the desired shape of spool 102. Appropriate resins may be selected based at least in part on an understanding of the likely maximum temperatures which the spool 102 will be subjected to during operation of the compressor 100. In relatively low temperature applications, various epoxies may be selected as the appropriate binding resin. In relatively high temperature applications, a high temperature resistant binding resin such as polysilazane may be used.

Figure 2A:
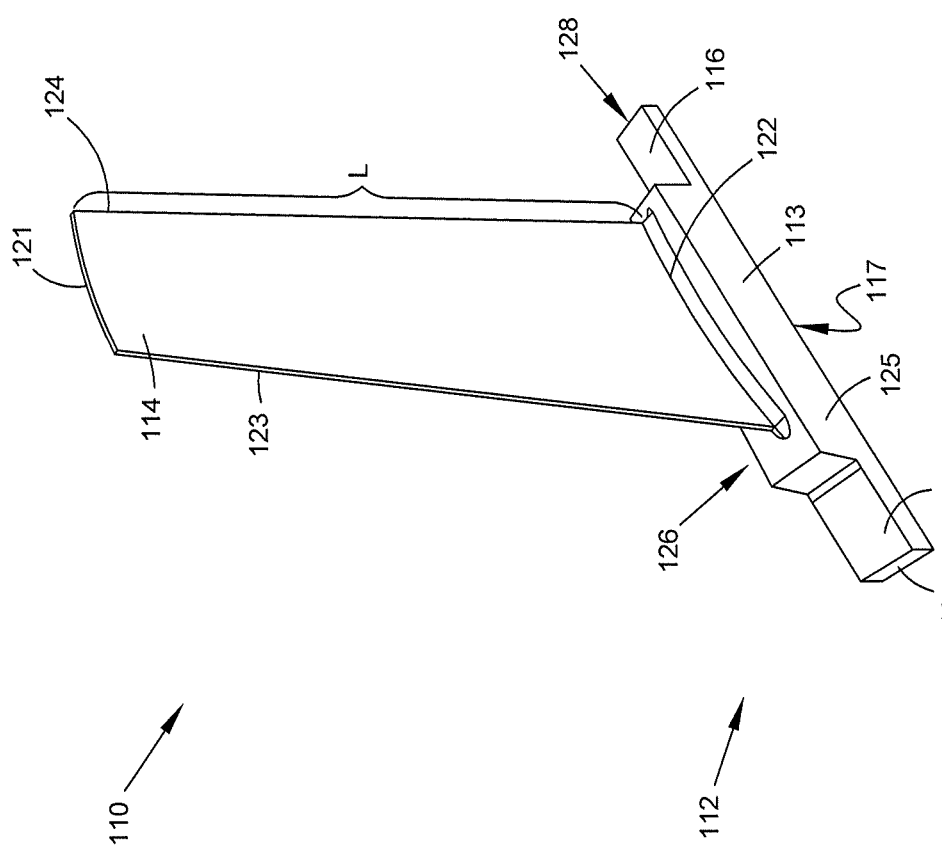
FIG. 2A is an isometric view of a blade assembly of a rotatable assembly of an axial flow compressor in accordance with some embodiments of the present disclosure.

FIG. 2A presents an isometric view of a blade assembly 110 of a rotatable assembly 150 of an axial flow compressor 100 in accordance with some embodiments of the present disclosure. Blade assembly 110 is adapted to be coupled to spool 102 as will be described in greater detail below. Blade assembly 110 may also be referred to as an insert.

Blade assembly 110 comprises a platform member 112 and blade 114 which is coupled to and extends away from the platform member 112. In some embodiments platform member 112 and blade 114 are integrally formed as a single component. Platform member 112 may also be referred to as a base.

Blade 114 comprises a tip 121, root 122, leading edge 123, and trailing edge 124. Leading edge 123 is axially forward of trailing edge 124. A blade length L is defined between the tip 121 and root 122. Blade 114 is joined, coupled, or mounted to platform member 112 proximate root 122.

Platform member 112 may comprise a central portion 113 having a first thickness and a forward tang 115 and aft tang 116 having thicknesses which are less than first thickness. Forward tang 115 extends axially forward of the leading edge 123 of blade 114, and aft tang 116 extends axially aft of the trailing edge 124 of blade 114.

The bottom 117, or radially-inward facing surface, of platform member 112 may be contoured to match or substantially conform to the exterior surface 104 of spool 102.

Figure 2D:
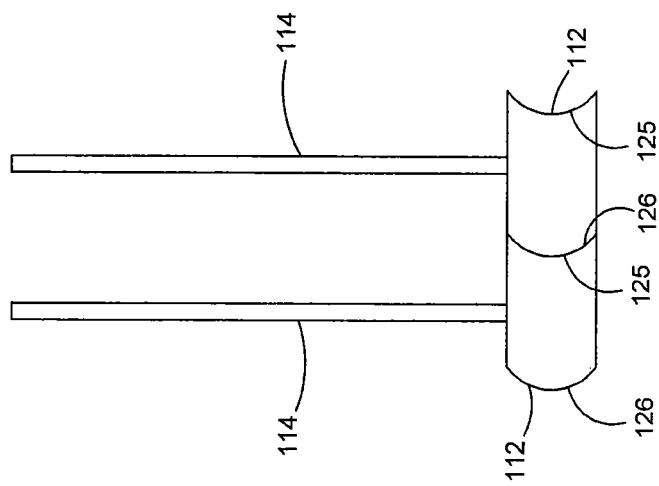
FIG. 2D is a front profile view of a pair of blade assemblies of a rotatable assembly of an axial flow compressor in accordance with some embodiments of the present disclosure.
Figure 2C:
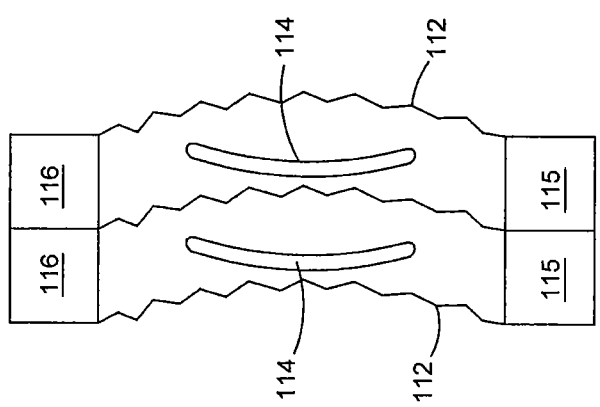
FIG. 2C is a top profile view of a pair of blade assemblies of a rotatable assembly of an axial flow compressor in accordance with some embodiments of the present disclosure.
Figure 2B:
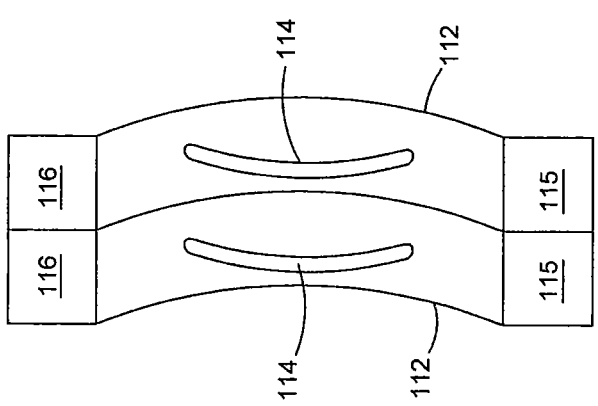
FIG. 2B is a top profile view of a pair of blade assemblies of a rotatable assembly of an axial flow compressor in accordance with some embodiments of the present disclosure.

The sides 125, 126 of the platform member 112 may be configured to join with adjacent blade assemblies 110 when attached to spool 102. For example, as shown in FIGS. 2B and 2D in some embodiments platform member 112 has arcuate sides 125, 126 in either the axial or radial dimension, the arcuate sides 125, 126 adapted to interlock or match with adjacent platform members 112. Similarly, surface 127 and surface 128 of the platform member 112 may be adapted to interlock or match with other platform members 112 disposed adjacent in the axially forward or axially aft direction. In some embodiments, one of surface 127 and surface 128 may be concave and the other convex. In some embodiments, one or both of surface 127 and surface 128 comprise a toothed surface configured to interlock with a toothed surface of adjacent platform members 112. As another example, as shown in FIG. 2C sides 125, 126 may be toothed or patterned and thus adapted to interlock or match with adjacent platform members 112.

A plurality of blade assemblies 110 are used in the fabrication of the axial flow compressor 100. Each blade assembly 110 may be constructed using a resin transfer molding process. Each blade assembly 110 may be constructed using layers of fabric which are bonded and stiffened using a resin. As described above with respect to spool 102, an appropriate resin may be selected based on the specific application and the maximum design temperatures of the compressor 100. In some embodiments, at least one fabric layer used to construct a blade assembly 110 comprises boron or boron-based fibers, which may enhance the stiffness of blade 114 and blade assembly 110.

In some embodiments, blade 114 or blade assembly 110 may be coated with a protective material. For example, to protect the blade 114 and blade assembly 110 from oxidation, these components may be coated with Nanovate™. Nanovate™ is an electrodeposited (plated) nanocrystalline metal.

In some embodiments, blade 114 and blade assembly 110 may be manufactured by injection molding. The injection molding may use only resin as the constituent material of the blade 114 or blade assembly 110, or may use a mixture of resin and chopped fiber reinforcement. In some embodiments, exoskeleton materials are added to an injection molded blade 114 or blade assembly 110 to strengthen and protect those components. In some embodiments, an injection molded blade 114 or blade assembly 110 are coated with Nanovate™ or similar material. In some embodiments an injection molded blade 114 or blade assembly 110 is covered with a metal alloy, such as nickel alloy.

Figure 1B:
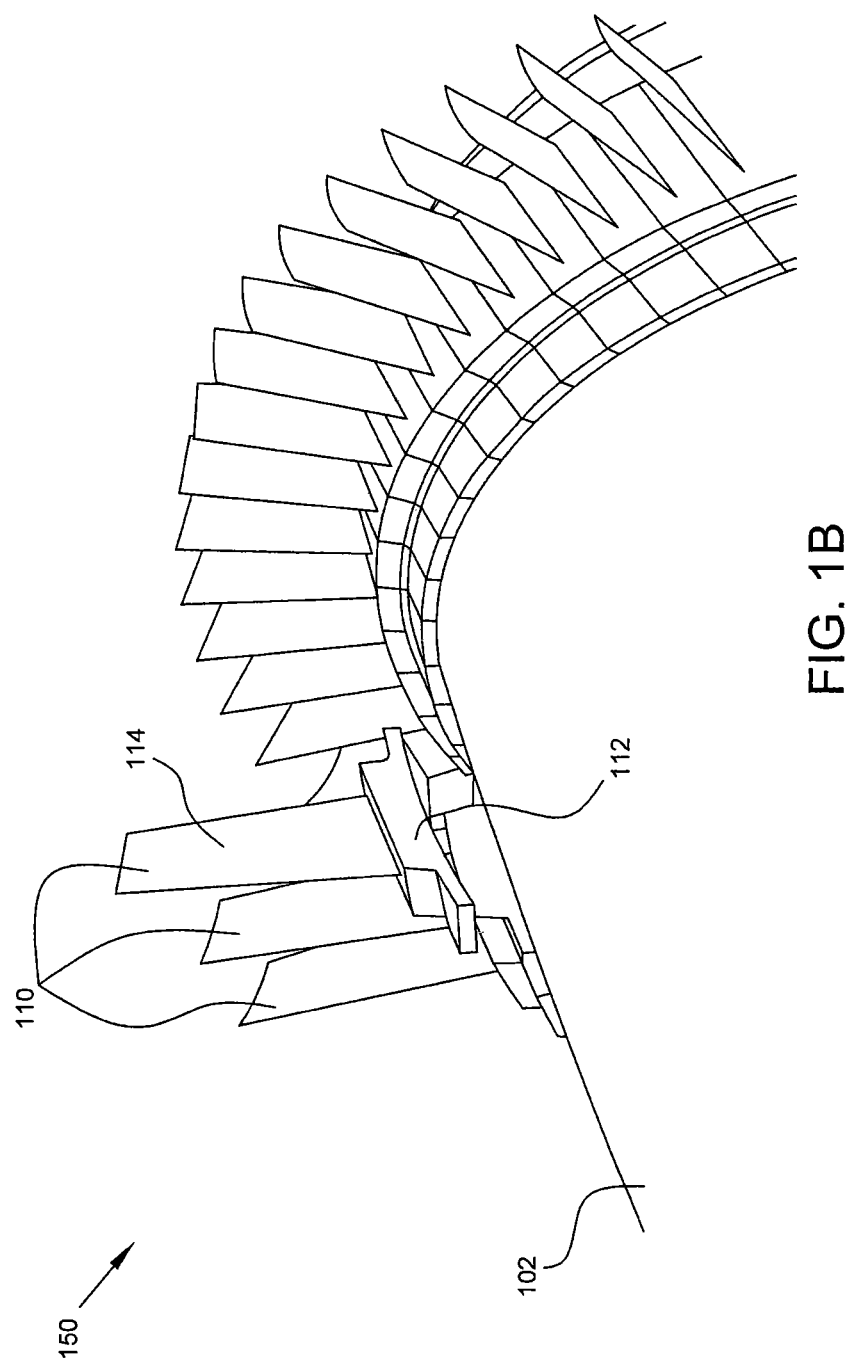
FIG. 1B is an isometric view of a partially-assembled rotatable assembly of an axial flow compressor in accordance with some embodiments of the present disclosure.

FIG. 1B presents an isometric view of a partially-assembled rotatable assembly 150 of an axial flow compressor 100. As shown in FIG. 1B, during assembly of the rotatable assembly 150 a plurality of blade assemblies 110 are coupled to spool 102. The bottom 117 or radially inward facing surface of platform member 112 is coupled to the exterior surface 104 of spool 102. Blade assemblies 110 are arranged in circumferential rows generally referred to as stages. Each stage has an axial location. Blade assemblies 110 may be axially arranged such that forward extensions 115 and aft extensions 116 of adjacent stages of blade assemblies 110 are in contact.

Blade assemblies 110 may be coupled to spool 102 using an adhesive, glue, epoxy, or similar material. The adhesive may be applied to the bottom 117 of the blade assembly 110, or to both the bottom 117 and side surfaces of each blade assembly in order to couple each blade assembly 110 both to the spool 102 and to adjacent blade assemblies 110. In some embodiments the adhesive is necessary only to hold blade assembly 110 to spool 102 while additional windings are added which more permanently bond the assemblies 110 to spool 102.

In some embodiments the stages of blade assemblies 110 are arranged or spaced to provide a gap 119 for stator vanes between the plurality of blades 114. In some embodiments forward tang 115 and aft tang 116 are sized to create this gap 119 when blade assemblies 110 are coupled to spool 102 such that forward extensions 115 and aft extensions 116 of adjacent stages of blade assemblies 110 are in contact.

In some embodiments each of the plurality of blades 114 in a stage have an equal blade length L. In some embodiments different stages of blade assemblies 110 have different blade lengths L.

In some embodiments blade assemblies 110 may be arranged on spool 102 substantially parallel to the axis of rotation. In other embodiments blade assemblies 110 may be arranged on spool 102 at an angle relative to the axis of rotation.

Figure 1C:
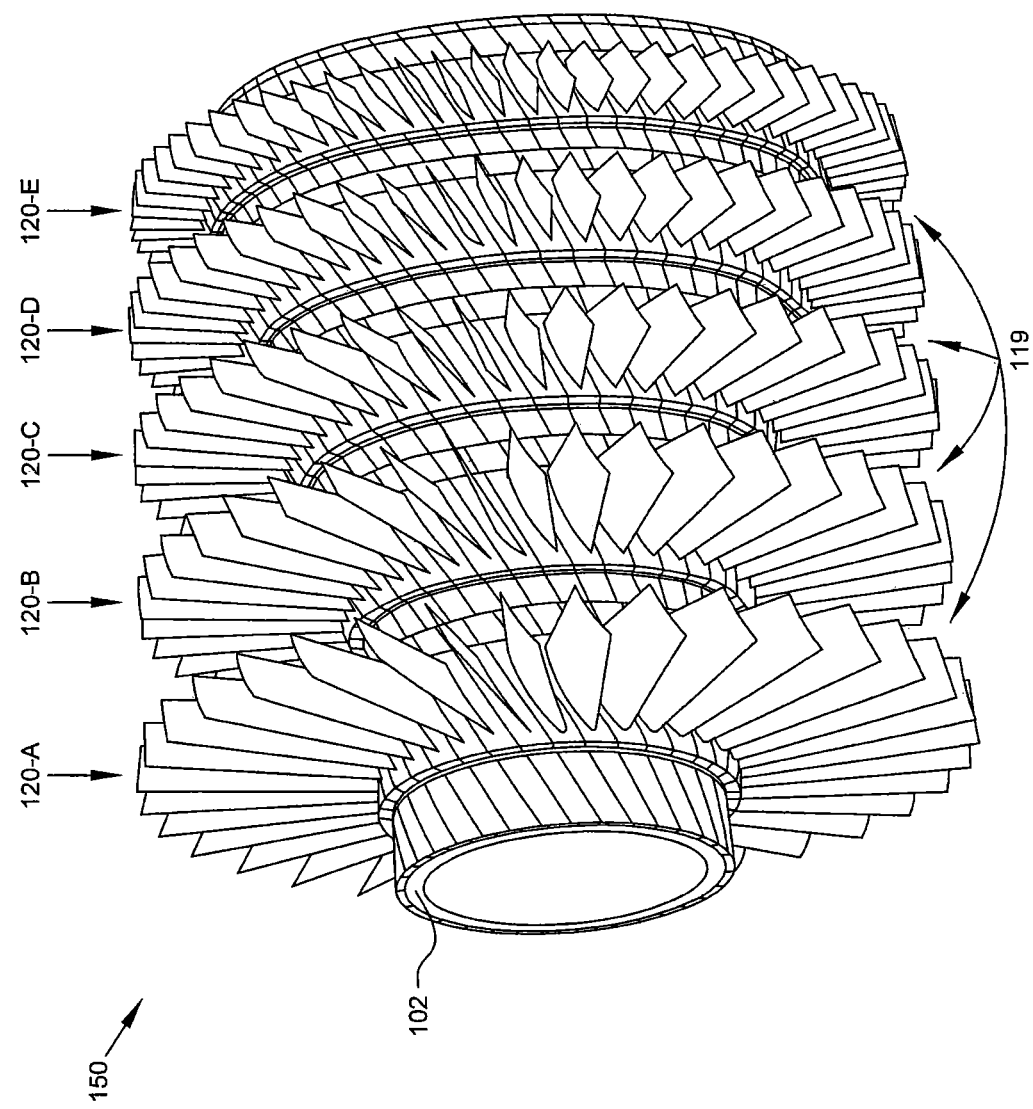
FIG. 1C is an isometric view of a partially-assembled rotatable assembly of an axial flow compressor in accordance with some embodiments of the present disclosure.

FIG. 1C presents an isometric view of a partially-assembled rotatable assembly 150 of an axial flow compressor 100. As shown in FIG. 1C, in some embodiments rotatable assembly 150 comprises five stages of blade assemblies 110. The blade assembly stages are labeled 120-A, 120-B, 120-C, 120-D, and 120-E, with 120-A being the axially forward most stage and 120-E being the axially aft most stage. Each of blade assembly stages 120-A through 120-E have a unique axial location along spool 102. In some embodiments the rotatable assembly 150 comprises more or less stages 120 than the embodiment illustrated in FIG. 1C.

In some embodiments the axially forward stage of blade assemblies 110 have a blade length L which is longer than the blade length L of the blade assemblies 110 of the axially aft stage. In some embodiments the blade length l decreases from the axially forward stage to the axially aft stage.

Gaps 119 between stages of blade assemblies 110 are provided. Once finally assembled, a plurality of stator vanes (not shown) extend radially inward from an outer casing member and are disposed in gaps 119.

Figure 1D:
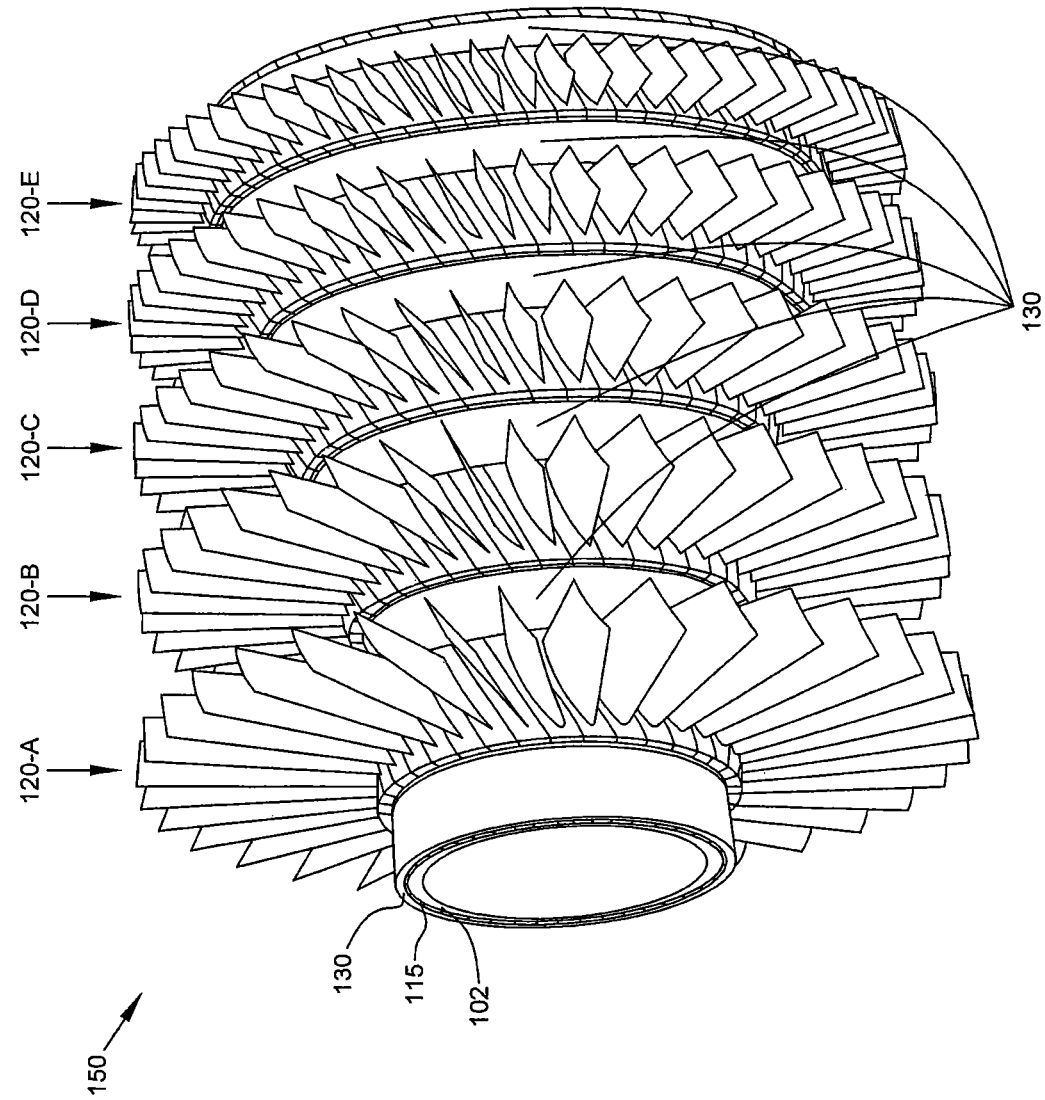
FIG. 1D is an isometric view of a partially-assembled rotatable assembly of an axial flow compressor in accordance with some embodiments of the present disclosure.

FIG. 1D presents an isometric view of a partially-assembled rotatable assembly 150 of an axial flow compressor 100. Once the plurality of blade assemblies 110 are coupled to spool 102 in stages 120-A through 120-E as described above with reference to FIG. 1C, a annular band 130 is added which serves as the primary means for holding the blade assemblies 110 to spool 102. Annular band 130 comprises a wound layer or layers of fiber or filament which is wound about each forward tang 115 and aft tang 116 of platform member 112. Resin may be used to cure or harden the fibrous band. In some embodiments, band 130 covers the radially outward facing surfaces of each forward tang 115 and aft tang 116 of the plurality of blade assemblies 110.

Band 130 must have sufficient strength to withstand the centrifugal loading of the blade assemblies 110 during operation of the compressor 100.

Figure 3:
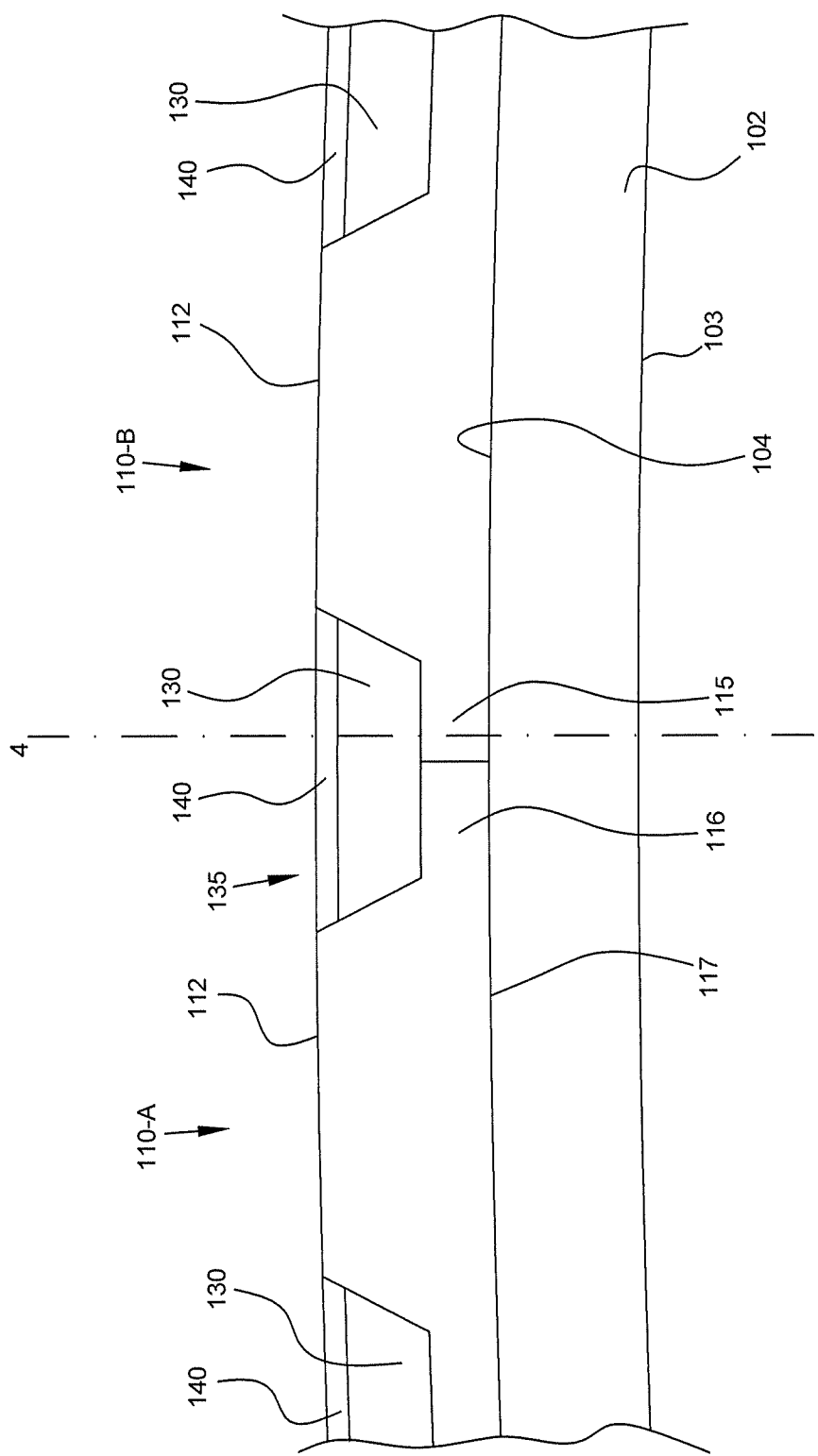
FIG. 3 is a partial cross-sectional view of a rotatable assembly of an axial flow compressor in accordance with some embodiments of the present disclosure.

FIG. 3 presents a partial cross-sectional view of a rotatable assembly 150 of an axial flow compressor 100. As shown in FIG. 3, blade assemblies 110 are coupled to spool 102 by applying adhesive between a bottom surface 117 of platform member 112 and the exterior surface 104 of spool 102. In some embodiments, blade assemblies 110 are arranged such that aft tang 116 of a forward mounted blade assembly 110-A may be in contact with a forward tang 115 of an aft mounted blade assembly 110-B. In other embodiments, a gap (not shown) may be present between blade assembly 110-A and 110-B such that aft tang 116 of a forward mounted blade assembly 110-A may not be in contact with a forward tang 115 of an aft mounted blade assembly 110-B.

A recessed region 135 may be defined between a forward mounted blade assembly 110-A and aft mounted blade assembly 110-B. A band 130 may fill or partially fill the recessed region 135. The band 130 may be disposed radially outward from the aft tang 116 of a forward mounted blade assembly 110-A and the forward tang 115 of an aft mounted blade assembly 110-B.

FIG. 1E presents an isometric view of a partially-assembled axial flow compressor 100. In some embodiments, following the addition of band 130, an abradable layer 140 is added to the compressor 100. The abradable layer 140 may be a coating which is applied over the band 130, such that the abradable layer 140 is radially outward from the band 130.

As shown in FIG. 3, the abradable layer 140 may be added over band 130. In some embodiments the combination of band 130 and abradable layer 140 together fill the recessed region 135.

In some embodiments the abradable layer 140 covers a wider axial surface than the band 130. In other words, in some embodiments the abradable layer 140 covers the band 130 and at least a portion of platform member 112.

The abradable layer 140 may be added in some embodiments to allow for the stator vanes (not shown) to wear in to their proper radial locations during operation. As rotatable assembly 150 is rotated during the operation of axial flow compressor 100, abradable layer 140 may rub against and be worn away by the ends of stator vanes. Abradable layer 140 thus serves to minimize fluid flow over the ends of stator vanes, thus improving the efficiency of compressor 100.

Figure 4:
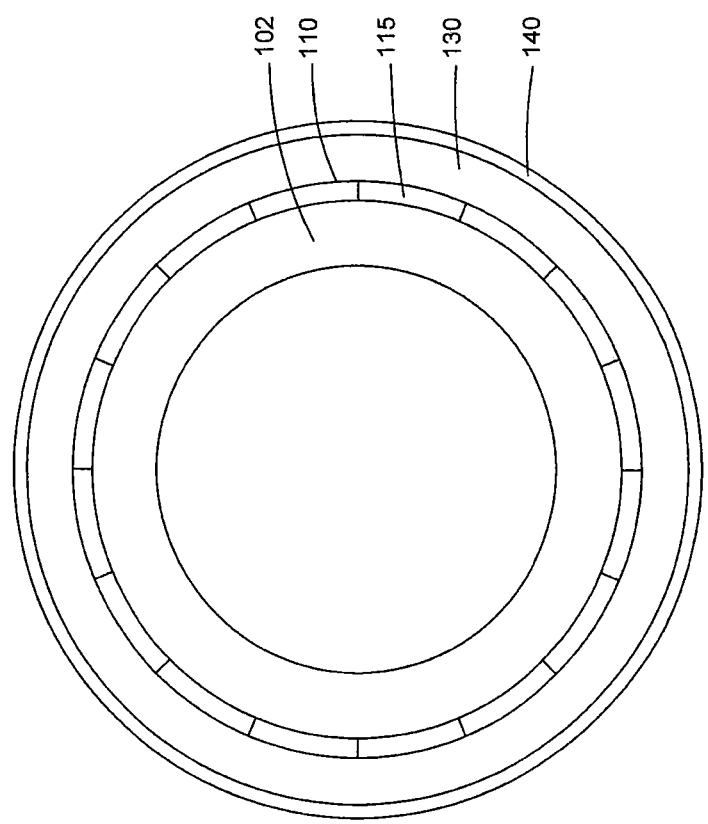
FIG. 4 is a cross-sectional view of the axially forward end of a rotatable assembly of an axial flow compressor in accordance with some embodiments of the present disclosure.

FIG. 4 presents a cross-sectional view of the axially forward end 105 of a rotatable assembly 150 of an axial flow compressor 100. FIG. 4 is presented as viewed looking the aft direction. As shown in FIG. 4 and as described above, a plurality of blade assemblies 110 are coupled to the exterior surface 104 of spool 102. The portion of blade assemblies 110 seen in FIG. 4 are the forward extensions 115. A band 130 may be added over the forward extensions 115, and an abradable layer 140 may be added over the band 130.

Once rotatable assembly 150 is assembled as described above, it is coupled to a rotatable shaft and encased within a static casing.

Through the presentation of FIGS. 1A through 1E above, a method is also presented for the manufacture of rotatable assembly 150. The method comprises a first step of winding fibers and resin over a mandrel to form a spool 102; a second step of attaching a plurality of blade assemblies 110 to the spool 102 in stages 120, each stage having a unique axial location along the spool 102; a third step of winding additional fibers and resin around the spool 102 with a plurality of blade assemblies 110 attached to form a band 130 which at least partially covers forward tangs 115 and aft tangs 116 of the blade assemblies 110; and a fourth step of curing the fibers and resin.

An optional step includes adding an abradable layer 140 over the band 130. The method may continue by encasing the disclosed rotatable assembly in a casing having a plurality of stator vanes, the stator vanes disposed between stages 120 of blade assemblies 110. The stator vanes may be adapted to engage the abradable layer 140.

The disclosed axial flow compressor 100 having a rotatable assembly 150 as described above has numerous and varied applications in the field of fluid compression. Such applications include, but are not limited to, aviation applications such as gas turbine engines for aircraft and unmanned aerial vehicles (UAVs), expendable compressor applications such as for missile propulsion systems, land- and sea-based gas turbine engines providing electrical generation and/or propulsion, and any rotating machinery generally.

The present disclosure additionally provides systems and methods for manufacturing and/or assembling an axial stage of a gas turbine engine compressor. FIGS. 6 through 9 illustrate such systems and methods.

Figure 6A:
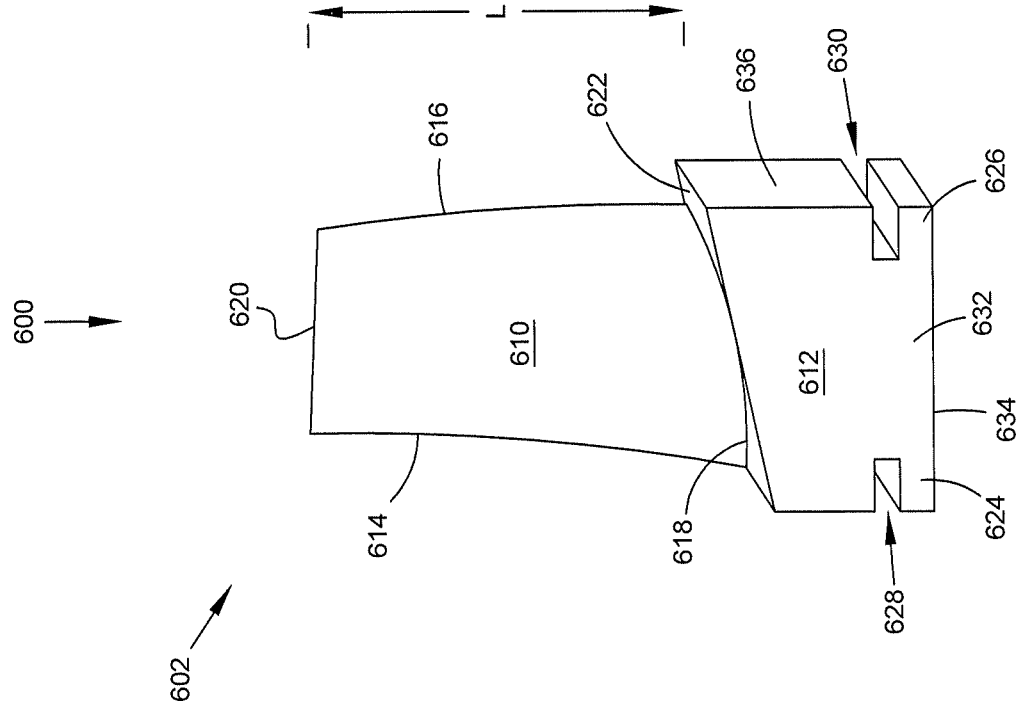
FIG. 6A is a perspective view of a blade assembly of an axial stage in accordance with some embodiments of the present disclosure.
Figure 6B:
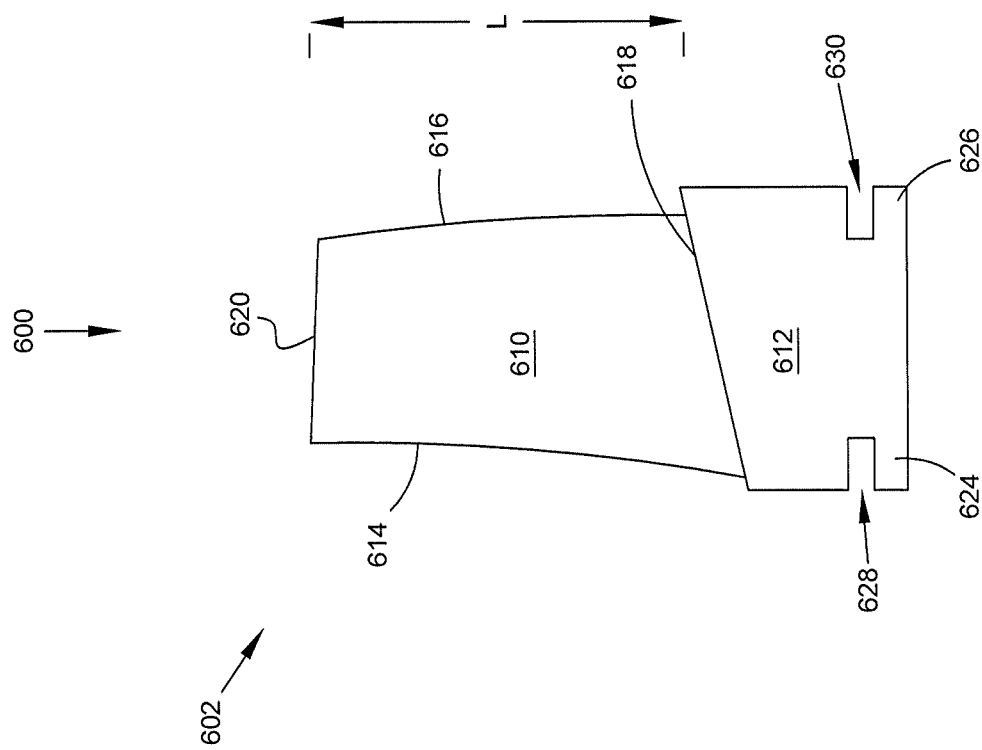
FIG. 6B is a profile view of a blade assembly of an axial stage in accordance with some embodiments of the present disclosure.

FIG. 6A is a perspective view of a blade assembly 602 of an axial stage 600, and FIG. 6B is a profile view of a blade assembly 602 of an axial stage 600 in accordance with some embodiments of the present disclosure. FIG. 7 is a cross-sectional cutaway view of a blade assembly 602 in an axial stage 600 in accordance with some embodiments of the present disclosure.

As can be seen in FIG. 7, an axial stage comprises a blade assembly 602, a hub 604, and a pair of end caps that may be referred to as forward end cap 606 and aft end cap 608.

Blade assembly 602 comprises a blade 610 and a base 612. Blade 610 comprises a leading edge 614, trailing edge 616, root 618, and blade tip 620. Leading edge 614 is axially forward of trailing edge 616. A blade length L is defined between the blade tip 620 and the root 616. Blade 610 is joined, coupled, or mounted to a platform 622 of the base 612.

Base 612 comprises a body that defines the platform 622, a forward tang 624 and an aft tang 626. Forward and aft tangs 624, 626 are radially spaced from the base 612 to form a forward channel 628 and aft channel 630. Radial spacing of the forward and aft tangs 624, 626 may be accomplished by a flange 632 that extends radially inward. Base 612 further comprises a radially-inward surface 634. Platform 622 may form the radially inner boundary of an axial compressor flowpath. In some embodiments forward tang 624 terminates prior to extending axially equal to or beyond body 636. In some embodiments aft tang 626 terminates prior to extending axially equal to or beyond body 636.

Blade assembly 602 may be formed through injection molding. Materials used to manufacture blade assembly 602 may include those suitable for injection molding, such as for example a high temperature capable polymer such as poly ether ether ketone (PEEK). The materials used to manufacture blade assembly 602 may be reinforced with fibers such as glass or carbon. Blade assembly 602 may further be encapsulated in a high strength nanocrystalline shell, such as a nickel or cobalt alloy.

Hub 604 may comprise a continuously wound carbon fiber ring and may further comprise resin. In some embodiments hub 604 comprises a high strength carbon fiber such as Toray™ T700 and resin such as PEEK. Hub 604 may be encapsulated in a high strength nanocrystalline shell such as a nickel shell. Hub 604 is the primary load support for the axial stage 600.

End caps 606 and 608 retain the blade assembly 602 to hub 604. End caps 606, 608 may also be formed using injection molding, and may be formed from PEEK with or without reinforcing fibers. End caps 606, 608 may further be encapsulated in a high strength nanocrystalline shell, such as a nickel or cobalt alloy. End caps 606, 608 transfer loads between the blade assembly 602 and the hub 604.

Axial stage 600 comprises a single, rotatable stage of an axial compressor. Axial stage 600 may be loaded with additional stages axially adjacent, and/or with stator vanes separating axial stages. In conjunction with one or more stator vanes and one or more additional axial stages, axial stage 600 forms an axial compressor.

Figure 8:
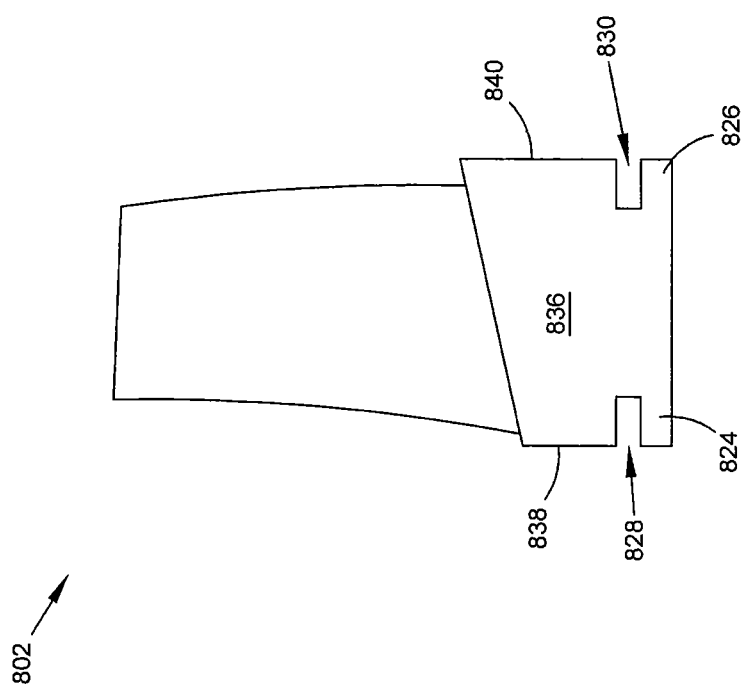
FIG. 8 is a profile view of a blade assembly of an axial stage in accordance with some embodiments of the present disclosure.
Figure 9:
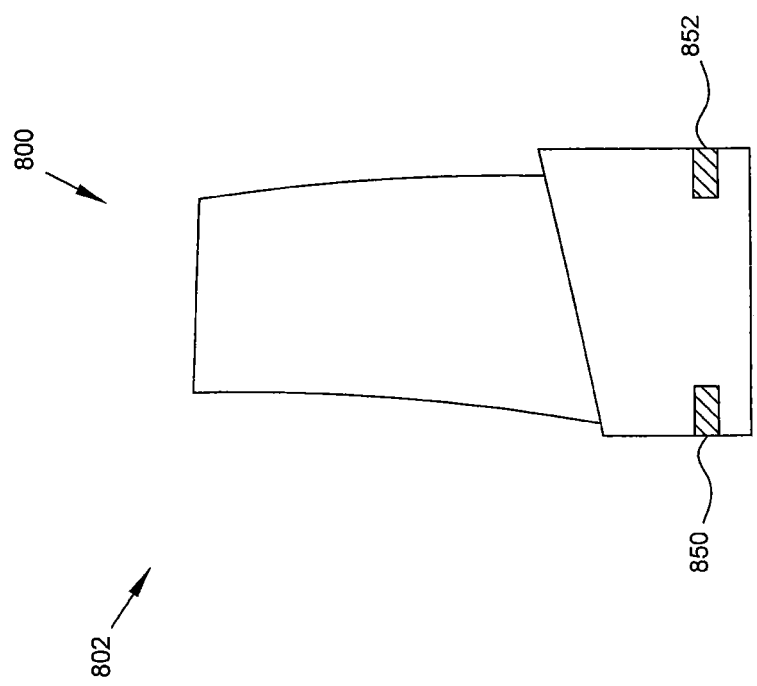
FIG. 9 is a cross-sectional cutaway view of a blade assembly in an axial stage in accordance with some embodiments of the present disclosure.

Yet another embodiment of the present disclosure is presented in FIGS. 8 and 9. A blade assembly 802 is shown in FIG. 8 and is substantially as described above with reference to FIGS. 6A and 6B. In the blade assembly 802 of FIG. 8, forward tang 824 extends axially equal to the forward surface 838 of body 836, and aft tang 826 extends axially equal to the aft surface 840 of body 836. A forward channel 828 is defined between forward tang 824 and body 836, and an aft channel 830 is defined between aft tang 826 and body 836. Blade assembly 802 is manufactured consistent with the description above provided for blade assembly 602.

FIG. 9 presents a cross-sectional view of a blade assembly 802 in an axial stage 800. In this embodiment, a forward ring 850 and aft ring 852 are disposed in forward channel 828 and aft channel 830, respectively. Forward ring 850 and aft ring 852 join a plurality of blade assemblies 802 into an axial stage 800, and directly supports loading of the blade assemblies 802. Each of forward and aft rings 850, 852 may be manufactured as described above with reference to hub 604.

Axial stage 800 comprises a single, rotatable stage of an axial compressor. Axial stage 800 may be loaded with additional stages axially adjacent, and/or with stator vanes separating axial stages. In conjunction with one or more stator vanes and one or more additional axial stages, axial stage 800 forms an axial compressor.

The present disclosure provides many advantages over previous axial flow compressors. By constructing a rotatable assembly entirely or partially from composite materials, the rotatable assembly achieves a significant reduction in weight. Particularly for aviation application, this weight reduction provides a substantial advantage over prior art compressors fabricated from metals and metal-based materials. The use of composite materials when fabricating the compressor may additionally lead to a cost savings due to lower prices of raw materials used in the compressor. Additional cost savings may be achieved through the reduction or elimination of numerous fasteners, discs, and seal assemblies currently required in advanced compressor designs. Finally, yet further cost savings may be achieved by faster and more simple manufacturing processes which are afforded by the rotatable assembly presently disclosed.

Although examples are illustrated and described herein, embodiments are nevertheless not limited to the details shown, since various modifications and structural changes may be made therein by those of ordinary skill within the scope and range of equivalents of the claims.

What is claimed is:

1. A composite turbomachine comprising:
    a spool comprised of fiber and resin; and
    a plurality of blade assemblies, each one of the plurality of blade assemblies comprising:
        a blade having a tip, a root, a leading edge, and a trailing edge, the blade mounted to a base at the root; and
        a forward tang and an aft tang extending from the base, the forward tang extending forward of the leading edge proximate the root and the aft tang extending aft of the trailing edge proximate the root,
    wherein the plurality of blade assemblies are arranged circumferentially around the spool at a first axial location,
    wherein each blade assembly of the plurality of blade assemblies interlocks with an adjacent blade assembly of the plurality of blade assemblies and is retained in position by a first band overwrapping the forward tangs and a second band overwrapping the aft tangs so as to form a first stage,
    wherein the first band extends axially beyond the forward tangs and the second band extends axially beyond the aft tangs, and
    wherein an outer layer of abradable material is disposed on a first radially outer surface of the first band and on a second radially outer surface of the second band.

2. The turbomachine of claim 1, wherein the first and second band comprise a plurality of fibers interconnected by resin.

3. The turbomachine of claim 1, wherein each blade assembly of the plurality of blade assemblies further comprises a blade platform having one or more faces, and wherein a first blade assembly of the plurality of blade assemblies interlocks with a second blade assembly of the plurality of blade assemblies via the one or more faces of the respective blade platforms.

4. The turbomachine of claim 3, wherein one face of each blade assembly of the plurality of blade assemblies is concave and one face of each blade assembly of the plurality of blade assemblies is convex.

5. The turbomachine of claim 3, wherein one face of each blade assembly of the plurality of blade assemblies includes a plurality of teeth that interlock with a plurality of teeth on an adjacent face.

6. The turbomachine of claim 1, wherein the plurality of blade assemblies are injected molded and encased in a metal alloy.

7. The turbomachine of claim 6, wherein the metal alloy is a nickel alloy.

8. The turbomachine of claim 1, further comprising a second plurality of blade assemblies arranged circumferentially around the spool at a second location aft from the first location, each blade assembly of the second plurality of blade assemblies interlocking with an adjacent blade assembly and retained in position by a third band.

9. The turbomachine of claim 8, wherein the third band comprises a plurality of fiber interconnected by resin.

10. The turbomachine of claim 8, further comprising a plurality of stators located between the first and second locations.

11. The turbomachine of claim 10, further comprising a casing surrounding the second plurality of blade assemblies, wherein the plurality of stators are connected to the casing.

12. The composite turbomachine of claim 1, wherein the outer layer extends axially beyond the first band and the second band.

13. A composite turbomachine comprising:
a spool comprised of fiber and resin;
a first and second blade assembly, the first blade assembly positioned on the spool at a first axial location and the second blade assembly positioned on the spool at a second axial location aft of the first axial location, each blade assembly comprising:
    a blade having a tip, a root, a leading edge, and a trailing edge, the blade mounted to a base at the root; and
    a forward tang and an aft tang extending from the base, the forward tang extending forward of the leading edge proximate the root and the aft tang extending aft of the trailing edge proximate the root; and
a band overwrapping the aft tang of the first blade assembly and the forward tang of the second blade assembly,
wherein an outer layer of abradable material is disposed on a radially outer surface of the band.

14. The composite turbomachine of claim 13 wherein the aft tang of the first blade assembly and the forward tang of the second blade assembly form an overwrapping surface, and wherein the band overlays the overwrapping surface.

* * * * *